United States Patent [19]

Hill

[11] Patent Number: 5,222,665

[45] Date of Patent: Jun. 29, 1993

[54] FLUID INJECTION SPRAY SYSTEM

[75] Inventor: Daryl G. Hill, Yakima, Wash.

[73] Assignee: Orchard-Rite Ltd., Inc., Yakima, Wash.

[21] Appl. No.: 882,957

[22] Filed: May 14, 1992

[51] Int. Cl.$^5$ .............................................. B05B 9/06
[52] U.S. Cl. ..................................... 239/77; 239/563; 239/551; 137/624.18; 47/2
[58] Field of Search ................. 239/581.4, 77, 66, 563, 239/562, 550, 551, 548, 78; 137/624.18; 222/505, 506; 47/2

[56] References Cited

U.S. PATENT DOCUMENTS

| | | | |
|---|---|---|---|
| 1,993,635 | 3/1935 | Towt | 47/2 |
| 1,998,856 | 4/1935 | Towt | 239/77 |
| 2,238,120 | 4/1941 | Launder | 239/77 |
| 3,067,541 | 12/1962 | Smith | 47/2 |
| 3,123,304 | 3/1964 | Sutton | 239/214.25 |
| 3,296,739 | 1/1967 | Wiegel | 47/2 |
| 3,944,139 | 3/1976 | Butler | 239/77 |
| 4,643,355 | 2/1987 | Sanders et al. | 239/418 |
| 5,082,177 | 1/1992 | Hill et al. | 239/77 |

Primary Examiner—Gregory L. Huson
Assistant Examiner—Christopher G. Trainor
Attorney, Agent, or Firm—Jacobson, Price, Holman & Stern

[57] ABSTRACT

A system is provided for introducing fluids into a wind stream. Such fluids may be used to cool the orchard during the late summer and early fall, to aid in prevention of frost damage during the spring, or to distribute agricultural chemicals. This invention ensures that the fluid is introduced into the wind stream in the most efficient manner, thus ensuring economical use of fluids and minimizing any detrimental environmental effects of their use. The fluid introduced into the wind stream is of such a fine character that the fluid is broken up into a mist which will carry over a great distance, such as a fog.

16 Claims, 2 Drawing Sheets

FLUID INJECTION SPRAY SYSTEM

FIELD OF THE INVENTION

This invention relates to methods and devices for moderating the deleterious effects of weather on trees and plants and their fruit.

DESCRIPTION OF RELATED ART

The present invention is a system of providing and distributing fluids into the wind stream of a wind machine for the purpose of reducing the temperature of a cultivated area, particularly areas with orchard crops. Conventional wind machines are used primarily to prevent frost damage to crops during the spring of the year. Their use when combined with the introduction of water into the wind stream will prevent hot weather damage to crops in the late summer and early fall.

U.S. Pat. No. 1,993,635 discloses an apparatus for preventing frosting and sunburning temperatures. In this invention, water is dispersed through a hollow shaft and through the propeller hub. Water is carried up the tower in a stationary water pipe which is connected by a pipe fitting to the hollow shaft.

U.S. Pat. No. 2,238,120 discloses a spraying device in which spray nozzles on a manifold are attached to a circular fan guide. The spraying device is oscillated manually over a limited arc by means of a grasping lever.

U.S. Pat. No. 3,067,541 discloses an apparatus in which water or other treatment fluid may be delivered through a duct to a discharge end where it is disbursed by a rotary blade mounted on a perpendicular axis In another embodiment, fuel and treatment fluids are delivered from a line to an angular recess, a conduit, and into discharge orifices on the rotary blades.

U.S. Pat. No. 3,123,304 discloses an orchard treating system in which water is introduced into a vertical tubular housing through a standpipe, enters a central inlet opening, and is dispersed by a rotating diffusing disk.

U.S. Pat. No. 3,296,739 discloses a rotating orchard heater in which water or fuel is supplied through a pipe elbow and through a hollow stem to nozzles mounted on a circular screen along the circumference or in the center of the screen.

U.S. Pat. No. 3,944,139 discloses a wind machine with a nozzle-bearing circular manifold mounted just below a rotating gear housing. A cam attached to the housing sequentially activates valves on the nozzles as the gear housing rotates.

U.S. Pat. No. 4,643,355 discloses a fog generator in which spray nozzles are mounted on a grid which is held by a counterbalance in the air stream generated by an air mover.

Therefore, the prior art discloses methods and apparatus for injecting fluids into the wind stream from a wind machine. The prior art does not disclose the improvements of the present invention which increase the economy and reliability of such fluid injection.

SUMMARY OF THE INVENTION

The present invention is an improvement to wind machines commonly used to prevent frost damage to orchard crops. Such wind machines include a tower surmounted by a rotating gear box to which a propeller is mounted. Power is supplied by an engine or a motor located at the bottom of the tower and is transmitted via a drive shaft to the gear box and hence to the propeller. The gear box rotates in a complete 360° circle thus generating a wind stream which rotates in a complete circle about the top of the tower.

The object of this invention is to provide a system for introducing fluids into a wind stream. Such fluids may be used to cool the orchard during the late summer and early fall, to aid in prevention of frost damage during the spring, or to distribute agricultural chemicals This invention ensures that the fluid is introduced into the wind stream in the most efficient manner, thus ensuring economical use of fluids and minimizing any detrimental environmental effects of their use. The fluid introduced into the wind stream is of such a fine character that the fluid is broken up into a mist which will carry over a great distance, such as a fog.

In a preferred embodiment, a plurality of nozzles are spaced about the periphery of a platform located at the top of a tower. The nozzles are interconnected by an annular ring from which water is supplied to each of the nozzles under pressure. A star cam connected to a valve of each of the nozzles is located on each of the nozzles such that by rotation of a gear box at the top of the tower to which is attached a propeller, the cam is turned by a trip lever mounted on the gear box to turn on and off the valves connected to the cam. Two sets of trip levers are mounted on opposite sides of the gear for permitting spray of two diametrically opposed nozzles for approximately 15 seconds of each four minute rotation of the gear box. Four pairs of opposed nozzles are located on the platform which surrounds the rotating gear box.

The pairs of nozzles energized by the rotation of the gear box dispense a stream of water in a direction perpendicular to the direction of air flow generated by the propeller attached to the gear box. The air stream carries the fine mist generated by the nozzles to form a fog.

It is an objective of this invention to prevent heat damage to orchard crops.

It is a further objective of this invention to achieve a 10° to 12° F. temperature drop in orchards.

It is a further objective of this invention to improve the quality of apples by lowering apple temperatures from the high 90's° to the mid 80's° F.

It is a further objective of this invention to moisten orchard crops with a relatively fine mist, such as a fog, which will prevent frost damage.

It is a further objective of this invention to provide foliar irrigation during hot weather which reduces stress on the crops.

It is a further objective of this invention to conserve fluids through the injection of fluids only into the optimal portion of the wind stream by sequentially activating fluid flow as the wind stream rotates.

It is a further objective of this invention to provide a cam mechanism to sequentially activate fluid flow into a rotating wind stream.

It is a further objective of this invention to apply agricultural chemicals such as pesticides, fertilizers, and growth regulators to orchard crops.

It is a further objective of this invention to provide an apparatus which is reliable, inexpensive to manufacture, maintain and use, and whose operations is of minimal detrimental effect on the environment.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
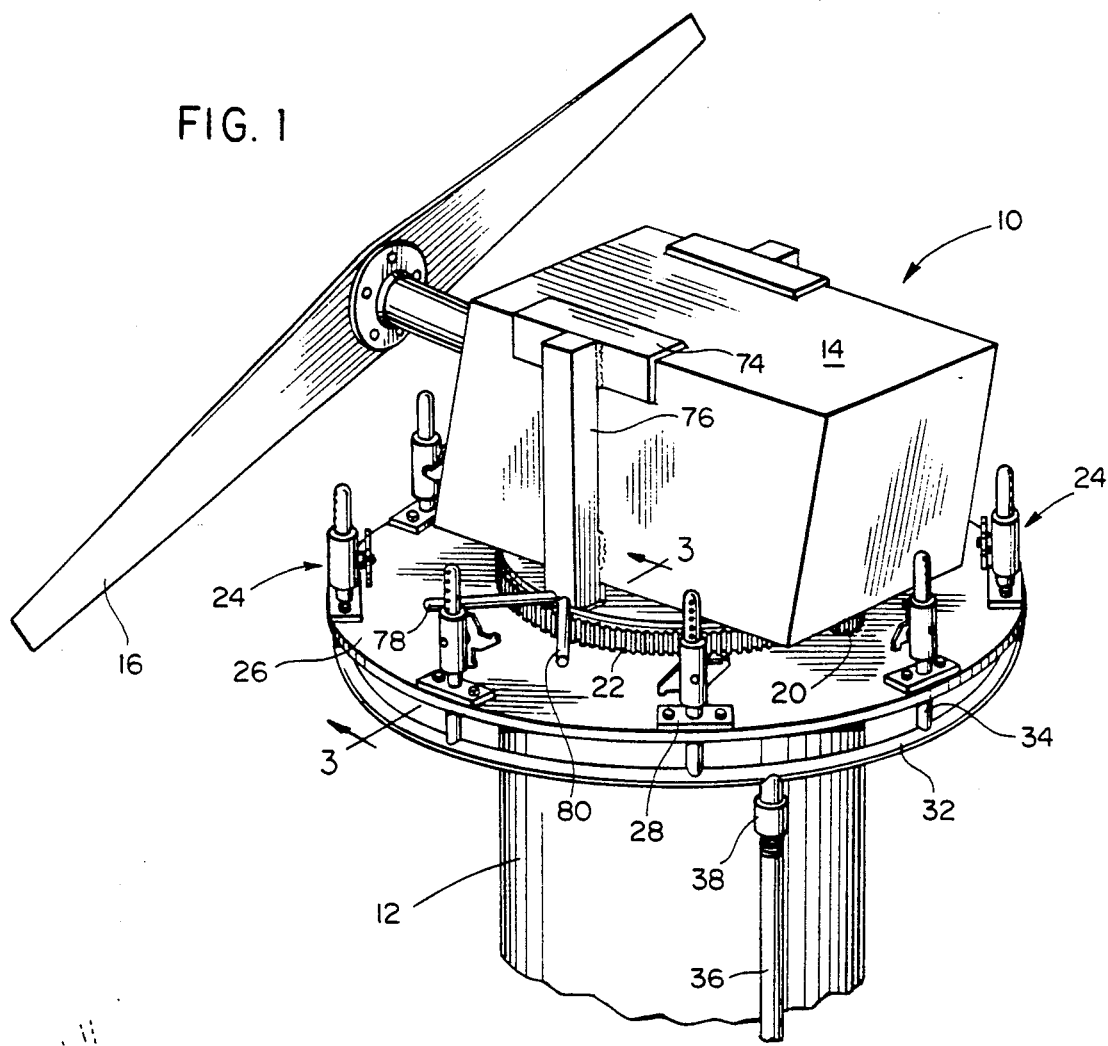
FIG. 1 is a perspective view of a rotating gear box which rotates about the top of a tower, with a plurality of nozzles surrounding a platform at the top of the tower, with the nozzles surrounding the gear box.
Figure 3:
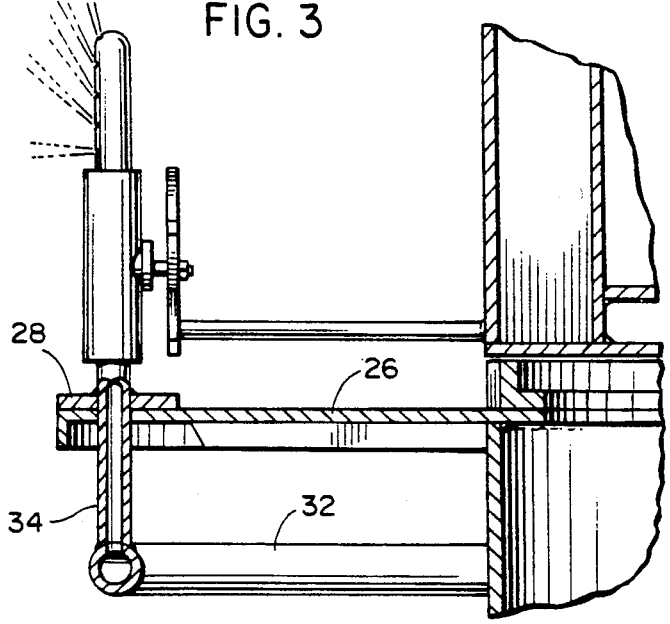
FIG. 3 is a sectional view taken along line 3—3 of FIG. 1.

In describing a preferred embodiment of the invention illustrated in the drawings, specific terminology will be resorted to for the sake in clarity. However, the invention is not intended to be limited to the specific terms so selected, and it is to be understood that each specific term includes all technical equivalents which operate in a similar manner to accomplish a similar purpose.

Figure 2:
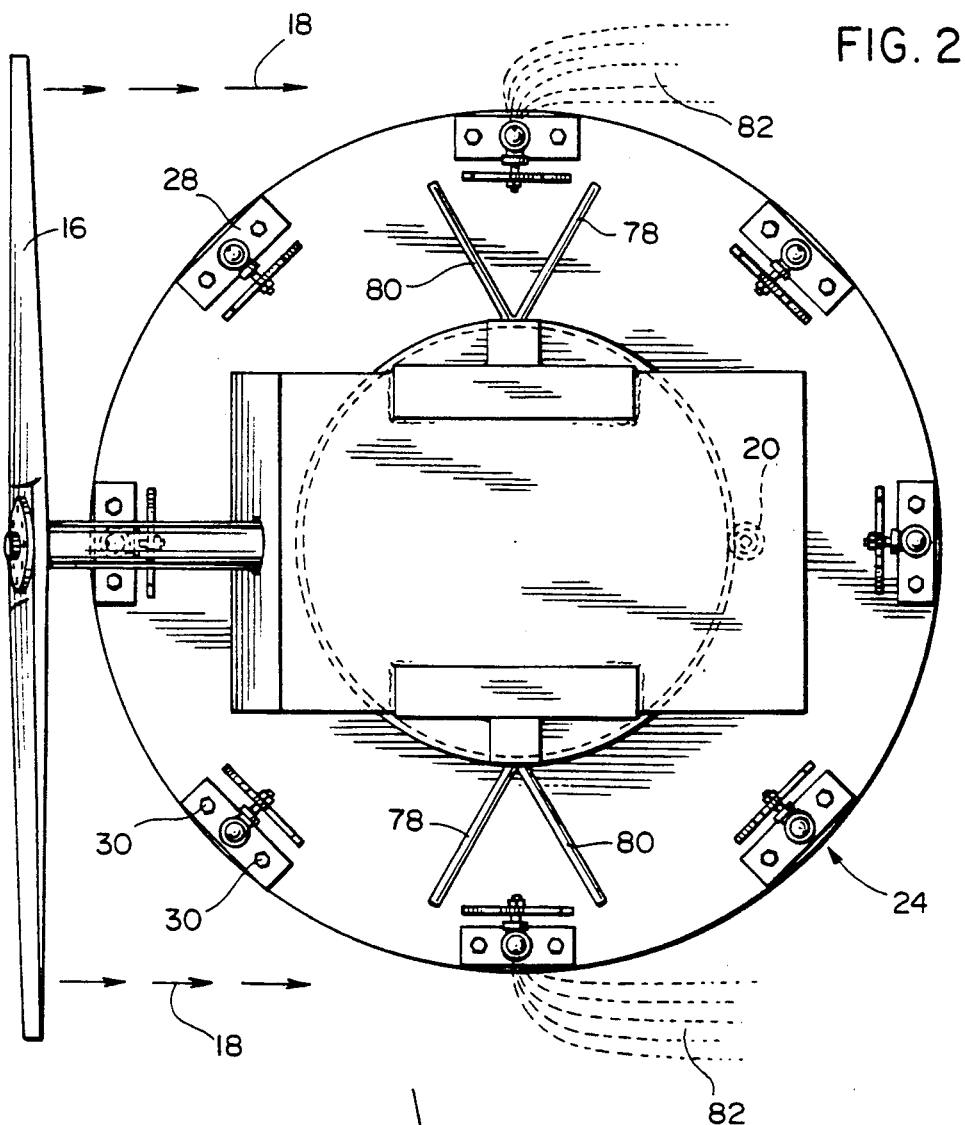
FIG. 2 is a top plan view of FIG. 1.

With reference to FIGS. 1 and 2, in particular, a fluid injection spray system embodying the teachings of the subject invention is generally designated as 10. The spray system is mounted at the top of a conventional tower 12. At the top of the tower is a rotating gear box 14 to which is attached a propeller 16. The use of a tower, the rotation of the gear box and the turning of the propeller is achieved in a manner already set forth in my prior U.S. Pat. No. 5,082,177 which is hereby incorporated by reference.

This invention is an improvement over my prior patent and is concerned with a system for injecting fluid into a air stream generated by the propeller 16. By rotation of the propeller 16, an air stream as indicated by arrows 18 in FIG. 2, is obtained.

The gear box rotates once about the top of the tower in approximately four minutes. A pinion gear 20 mounted on the gear box engages a fixed pinion gear 22 located at the top of the tower for rotation of the gear box.

Spaced about the top of the tower and surrounding the gear box are a plurality of nozzle assemblies 24. In the embodiment shown, there are eight nozzle assemblies forming four pairs of nozzle assemblies with each pair of nozzle assemblies including two diametrically opposed nozzle assemblies. Each nozzle assembly is secured to circular platform 26 located at the top of the tower by an anchor plate 28 having two bolts 30 passing through the plate 28 and platform 26.

Spaced below the platform is an annular liquid feed line 32 having eight riser pipes 34 which are connected to the nozzle assemblies for passage of water to each of the nozzle assemblies. A feed line 36 is connected to annular feed line 32 by coupling 38 for transfer of liquid, such as water, at a relatively high pressure, preferably approximately 150 PSI to the nozzle assemblies.

Figure 5:
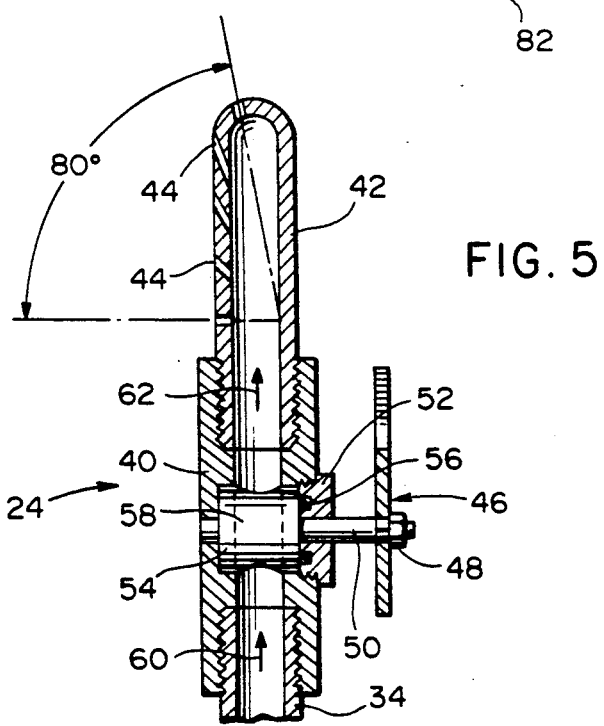
FIG. 5 is a sectional view taken along line 5—5 of FIG. 4.

Each nozzle assembly 24 includes a cylindrical section 40 which threadably engages riser pipe 34 as shown in FIG. 5. At the top of the cylindrical section 40 is a nozzle portion 42 threadingly engaging the cylindrical section for release of water into the atmosphere.

The nozzle portion includes five orifices 44 of approximately 3/32 inch diameter. The five orifices 44 are spaced about the nozzle portion, rising from an imaginary horizontal line to an angle of approximately 80° as shown in FIG. 5.

The positioning of the nozzle portion is such that the orifices point radially outwardly from the platform 26 for release of a fine mist spray of water in a radially outward direction. The nozzle assemblies function so that when the nozzle assemblies are actuated, the release of fine mist water in a radially outward direction, is also in a direction approximately parallel to propeller 16 which is producing an air stream.

The release of a fine mist water spray from the orifices is achieved by a star cam 46 which is secured by nut 48 to a cam shaft 50 which extends through a plug 52 threadingly engaged in a side wall of the cylindrical section 40 so that the cam shaft 50 is connected to a 360° rotational ball valve 54. An o-ring 56 seals the plug against the ball valve 54 to prevent escape of liquid.

The ball valve 54 is turned by 90° rotation of the cam shaft 50 upon movement of the star cam 46 so as to align a passage 58, shown in dotted lines of FIG. 5, to allow passage of fluid as indicated by arrows 60 and 62 from the riser pipe 32 to the orifices 44. Upon a subsequent 90° rotation of the star cam, the connecting passage 58 is turned to block the flow of liquid to orifices 44.

Figure 4:
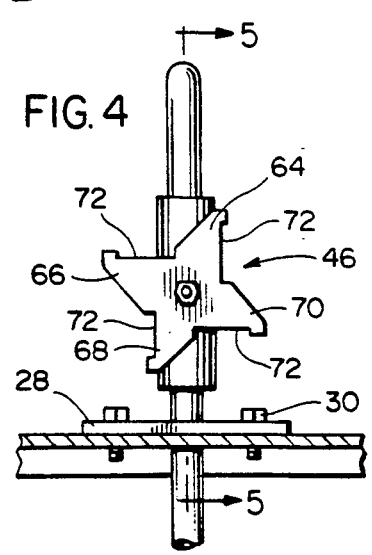
FIG. 4 is a side elevational view of a rear surface of a nozzle and its cam mechanism.

Star cam 46, as shown in FIG. 4, includes four equally spaced arms 64, 66, 68 and 70. Each of the arms includes a flat surface 72 for engagement with a trip lever.

Secured to the gear housing 14 is angled bracket 74 having downwardly extending column 76. At the base of the column 76 are two trip levers 78 and 80. Trip lever 78 is an on-trip lever which as moved by the rotation of gear housing 14 in a clockwise direction, engages a surface 72 of a lowermost arm of the star cam 46 so as to turn the arm and thereby turn the ball valve 54 to allow passage of fluid through the orifices 44. After a period of approximately 15 seconds of rotation of the gear housing 14, trip lever 80 engages a surface 72 of an adjacent arm of the star cam so as to again rotate the star cam by 90° to block the flow of fluid through the nozzle assembly 24 by the ball valves 54.

On an opposite side of the gear housing, as shown in FIG. 2, is a second set of trip levers 78, 80 to simultaneously allow fluid flow and to block fluid flow through a diametrically opposite nozzle assembly. Continued rotation of the gear housing causes simultaneously fluid flow and blockage of fluid flow through both diametrically opposite nozzle assembly pairs.

As shown in FIG. 2, when opposed nozzle assemblies 24 are allowed to have fluid flow, the dispersion of the mist 82 from the diametrically opposed nozzle assemblies is in a radially outward direction and in a direction approximately parallel to the longitudinal axis of the propellers so that the flow of fluid 82 is released in a direction perpendicular to the air flow 18. The release of fluid perpendicular to the moving air stream causes a wide dispersion of the fluid 82 in a direction away from the propeller 16. This direction of fluid flow maximizes exposure of a fine mist to the orchard or area within which the tower 12 is located.

This invention may be constructed of any suitable materials which meets the requirements of strength, resilience, and resistance to corrosion, such as steel, brass or bronze, or plastics.

This invention is to be used in the late summer and early fall to inject water into a wind stream to protect apples from damage caused by hot weather. A temperature drop of 10°-12° F. will be achieved and the apple temperatures will be lowered from the high 90's° F. to the mid 80's° F.

In addition, the invention may be used to add moisture to the atmosphere surrounding crops to protect such crops from frosting during cold nights.

Another application is in the provision of water as foliar irrigation of crops.

Agricultural chemicals such as pesticides, fertilizers, and growth regulators may also be applied to crops using the invention.

Having described the invention, many modifications thereto will become apparent to those skilled in the art to which it pertains without deviation from the spirit of the invention as defined by the scope of the appended claims.

I claim:

1. An improvement in wind machines of the type in which a propeller which rotates in a substantially vertical plane is mounted on a rotating gear box located at the top of a tower, wherein the improvement comprises:

a platform located at the top of the tower, an even number of nozzle assemblies spaced about the periphery of said platform with pairs of said nozzle assemblies being located diametrically opposite to each other on said platform, each nozzle assembly including a star cam and a valve means connected to said star cam for opening and closing a flow of liquid through said nozzle assembly by turning of said star cam, and two pairs of trip levers mounted on said gear box for engaging said star cam of each nozzle assembly and simultaneously turning said star cam of diametrically opposed said nozzle assemblies as said gear box is rotated.

2. An improvement in wind machines according to claim 1, wherein said star cam includes four equispaced arms.

3. An improvement in wind machines according to claim 1, wherein said nozzle assembly includes a plurality of orifices extending in a direction aligned radially outwardly from said platform.

4. An improvement in wind machines according to claim 3, wherein said plurality of orifices are spaced over an angle of 80°.

5. An improvement in wind machines according to claim 4, wherein said plurality of orifices includes five orifices.

6. An improvement in wind machines according to claim 5, wherein said nozzle assemblies includes eight nozzle assemblies.

7. An improvement in wind machines according to claim 1, wherein said valve means includes a ball valve having a central through passage with a cam shaft attached to said ball valve and said star cam.

8. An improvement in wind machines of the type in which a propeller which rotates in a substantially vertical plane is mounted on a rotating gear box located at the top of a tower, wherein the improvement comprises:

a platform located at the top of the tower, a plurality of nozzle assemblies spaced about the periphery of said platform, a source of water connected to each of said nozzle assemblies, engagement means secured to said rotating gear box, actuating means mounted on said nozzle assemblies and including a star cam for allowing and blocking flow of water to orifices located at one end of the nozzle assembly, said engagement means engaging said star cam to rotate said star cam to allow and block flow of water to said orifices, said engagement means simultaneously engaging said star cam of two diametrically opposed said nozzle assemblies during rotation of said gear box.

9. An improvement in wind machines according to claim 8, wherein said nozzle assembly includes a plurality of orifices extending in a direction aligned radially outwardly from said platform.

10. An improvement in wind machines according to claim 9, wherein said plurality of orifices are spaced over an angle of 80°.

11. An improvement in wind machines according to claim 10, wherein said plurality of orifices includes five orifices.

12. An improvement in wind machines according to claim 11, wherein said nozzle assemblies includes eight nozzle assemblies.

13. An improvement in wind machines according to claim 8, wherein said star cam includes four equispaced arms.

14. An improvement in wind machines according to claim 13, wherein each said arm includes a flat surface.

15. An improvement in wind machines according to claim 14, wherein said engagement means includes two pairs of trip levers mounted on opposite sides of said gear box.

16. An improvement in wind machines according to claim 15, wherein said two pairs of trip levers simultaneously engage diametrically opposed pairs of nozzle assemblies.

* * * * *